APPARATUS FOR COLOR REPRODUCTION

Filed March 29, 1948 4 Sheets-Sheet 1

INVENTOR.
CARLYLE W. JACOB
BY [signature]
ATTORNEY

Oct. 30, 1951 C. W. JACOB 2,573,143

APPARATUS FOR COLOR REPRODUCTION

Filed March 29, 1948 4 Sheets-Sheet 2

INVENTOR.
CARLYLE W. JACOB

BY [signature]

ATTORNEY

INVENTOR.
CARLYLE W. JACOB
BY B. Schlesinger
ATTORNEY

INVENTOR.
CARLYLE W. JACOB
BY
[signature]
ATTORNEY

Patented Oct. 30, 1951

2,573,143

UNITED STATES PATENT OFFICE 2,573,143

APPARATUS FOR COLOR REPRODUCTION

Carlyle W. Jacob, Rochester, N. Y.

Application March 29, 1948, Serial No. 17,773

21 Claims. (Cl. 178—5.2)

The present invention relates to a method and to apparatus for reproduction in color of colored pictures or objects, such as photographs, paintings, transparencies, films, and other colored pictorial representations.

It has been the general practice heretofore to use photographic methods for reproducing color pictures. In some systems, a set of printing plates are made, one for each color, and then from these the print is reproduced. In other systems, positives can be reproduced directly by use of expensive, highly sensitive special-type color-reproducing film. All known methods of reproducing colored pictures in color are expensive, time-consuming, and entail the employment of costly and delicate apparatus.

The primary purposes of the present invention are to provide a method and apparatus for reproducing colored pictures in color which will be simple, relatively inexpensive, direct, and fast.

Another object of the invention is to provide a system and apparatus for reproducing colored pictures in color which can be used for continuous reproduction of either individual pictures, or of colored motion picture film.

Another object of the invention is to provide a system and apparatus of the character described which can be used to make either positive or negative color reproductions from color originals.

A further object of the invention is to provide a system and apparatus of the character described which will record on the reproduction variations in color in the original with gradations in density and with extremely sharp definition.

Another object of the invention is to provide a method and apparatus for reproducing colored pictures in color in which color reproduction is effected by direct application of different colors of ink to the paper, or cloth or film base on which the reproduction is being made, and in which such application is under control of signals generated through scanning the picture which is to be reproduced.

Still another object of the invention is to provide a system and apparatus for reproducing colored pictures in color in which electrical signals generated by scanning an original colored picture are used to control through electronic means separate streams of air carrying in suspension differently colored ink particles which are directed against a record-receiving medium on which a facsimile of the original picture is to be reproduced.

A further object of the invention is to provide a recording system and apparatus in which a record can be made in different colors to record specific data as a result of electrical signals generated from and representing different basic intelligences.

A still further object of the invention is to provide a system and apparatus for reproducing colored pictures in color which can be operated at any distance from the picture which is to be reproduced and which may serve, therefore, for reproduction of telegraphed or televised pictures as well as for the simple reproduction of color prints, transparencies and the like.

Other objects of the invention will be apparent hereinafter from the specification and from the recital of the appended claims.

In the practice of this invention the sheet on which the reproduction is to be made, is moved in scanning relation relative to a recording head or gun. In a three-color reproduction system, a gun may be used that will apply the three differently colored inks separately to the record-receiving sheet or three separate guns may be employed, each of which delivers a differently colored ink. In either case, the gun first atomizes the ink so that the ink particles are carried as a fine mist in an air stream; then it carries the air stream past a corona electrode which ionizes the particles charging them with an electrical charge of high potential, and then the highly-charged particles are directed through a passageway one side of which is grounded and the other side of which has a voltage applied to it, which is of the same sign as the voltage applied to the particles by the electrode, and whose voltage is controlled by an electrical signal generated by scanning the picture which is to be reproduced. When the signal is zero, the ink droplets pass through the passageway in substantially full strength. When the signal is at a maximum all of the particles are precipitated on the grounded plate. Hence, the signal causes more or less of the ink particles to be deposited at one side of the passageway, and thereby controls the intensity of application of the ink at a given point on the recording sheet. Hence, the recording sheet at a particular point will be marked to a greater or less degree, or not at all, in accordance with the signal generated in scanning the original picture at a corresponding point. By using three air streams carrying differently colored ink particles, then, and controlling the precipitation of ink particles out of these three separate streams through signals generated by three-color scanning of the picture, which is to be reproduced, a full color reproduction of the original can be obtained. The scanning mechanism may be of any suitable type. Known electro-optical means may be employed for the purpose, and preferably means are provided for color correction of the signals.

Figure 1:
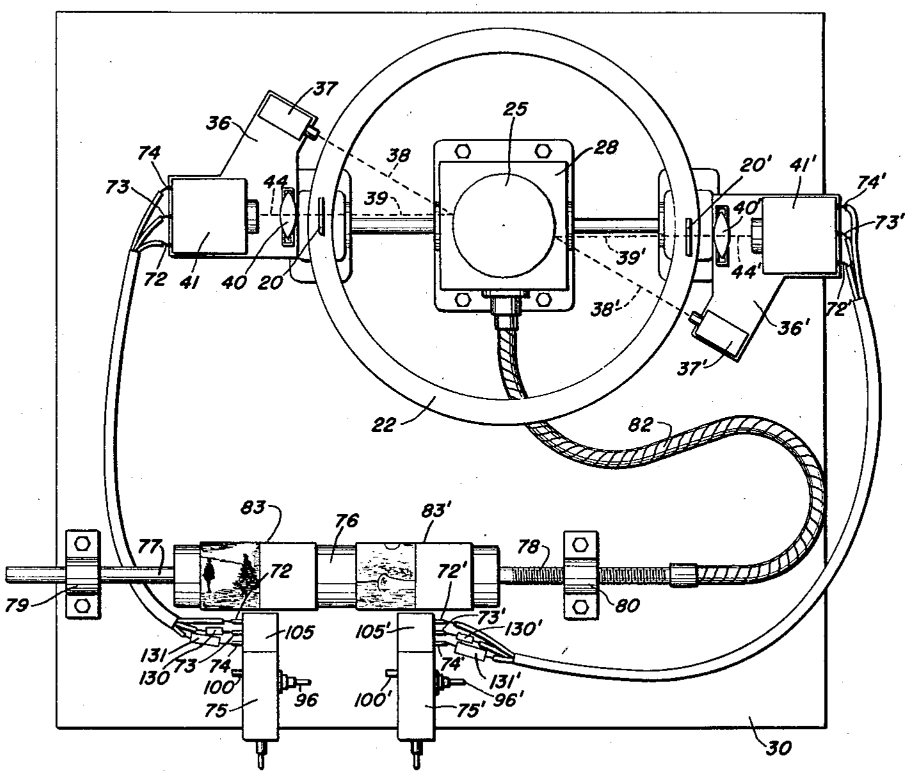
Fig. 1 is a plan view showing somewhat diagrammatically apparatus constructed according to one embodiment of this invention.

Scanning of the picture, which is to be reproduced, may be done, as already stated, in conventional manner and by conventional means. Likewise the signals, which control the recording heads or guns may be generated through known mechanism. However, for an understanding of the invention I shall describe generally process and apparatus for scanning the original picture and for generating the corresponding signal as well as the reproducing method and apparatus which consitute the basic novelty of the invention.

Referring particularly first to the modification of the invention shown in Figs. 1 to 6 inclusive, 20 and 20' denote two colored pictures which it is desired to reproduce. These are transparencies and are adapted to be mounted in any suitable manner upon a ring 22. The ring 22 is axially movable and for this purpose is supported at diametrically opposite points upon screws 23. These thread into nuts (not shown) that are secured in gear boxes 24 and they are adapted to be driven at the same rate by gearing contained within these gear boxes. Thus, the ring can be moved up or down in parallelism to itself, the direction of movement depending upon the direction of rotation of the screws.

Mounted centrally within the ring is a multifaced prism 25 whose faces are denoted at 26. The faces 26 are uniformly ground and coated with a thin reflecting film. The prism is mounted upon a shaft 27, which is adapted to be driven in time with the rotation of the screws 23, by suitable gearing housed in the gear box 28 and operatively connected with the gearing of the boxes 24. The gear boxes 24 and 28 may be secured to a base plate 30 by screws or bolts 31.

Mounted on the base 30 at points outside the ring 22 and diametrically opposite one another are two standards 35 and 35'. On these are mounted the electro-optical mechanism which cooperates with the prism 25 to scan the pictures 20 and 20' and to generate electrical signals which control the recording mechanism of the apparatus. Since the electro-optical mechanism used may be identical for each picture, that is to be reproduced, only one of these electro-optical mechanisms need be described in detail. Corresponding parts of the other electro-optical mechanism will be denoted by corresponding reference numerals primed.

On the standard 35 there is mounted a plate 36 upon which is secured a projector 37. The projector is constructed so as to direct a very narrow pencil of substantially white light, indicated by the dotted line 38, onto the prism 25.

As the prism 25 rotates, this narrow pencil of light 38 is reflected by each face of the rotating prism as a beam of light 39 which moves in a rotary scanning motion over the transparency 20. The projector is so constructed that this reflected beam 39 of light is focused on the transparency as a very tiny scanning spot. This spot travels horizontally across the film as the prism rotates; and it travels vertically over the film from top to bottom thereof as ring 22 is slowly raised. Thus, the rotary motion of the prism 25 causes a horizontal scanning of the picture and the axial motion of the ring 22 causes a vertical scanning thereof.

Mounted upon the plate 36 in alignment with and behind the transparency 20 is a lens 40. Mounted on the plate 36 also, behind the lens and in alignment therewith is a photo-receptive unit 41. The spot or pencil 44 of light, which passes through the transparency 20, is brought by the lens 40 to a substantially stationary small spot on the photo-receptive unit 41.

The unit 41 may be of any suitable structure. One way in which it may be constructed is illustrated diagrammatically in Fig. 6. In this form it includes two beam splitters 42 and 43, a red filter 45, a blue filter 50, a green filter 55, photo-receptive and preamplifier units 48, 51 and 56, and power amplifiers 60, 61 and 62. The photo-receptive and preamplifier units serve to convert the light received into electrical energy. They may be photo-electric cells.

The beam splitters 42 and 43 may be simply prism pairs cemented together with their contiguous faces silvered. The ray 44 of light from the lens 40 is adapted to be partly reflected from and partly transmitted through the beam splitter 42. The reflected pencil 46 of light from the beam splitter 42 passes through the red filter 45 onto the photosensitive and preamplifier unit 48. The light transmitted through the beam splitter 42 is divided by beam splitter 43, the reflected portion 49 passing through the blue filter 50 and falling upon the photo-receptive and preamplifier unit 51. The light 52 transmitted through the beam splitter 43 passes through the green filter 55 and enters the photo-receptive and preamplifier unit 56.

For simple uncorrected color reproduction, the electrical output from the units 48, 56 and 51 is passed directly to the power amplifiers 60, 61 and 62 and thence to the recording apparatus of the invention. However, if color correction is to be employed then modifying circuits, designated diagrammatically at 63, 64 and 65, are provided in the unit 41. These circuits may be of any conventional design. They may be constructed for instance, as are the color correction circuits disclosed in the U. S. patent to Murray et al. No. 2,253,086, granted August 19, 1941.

Where color correction is employed, the red channel output 66 modifies through connection 67 the green channel output 68, and the blue channel output 70 through connection 69, while the green channel output modifies the blue channel output 70 through the connection 71. The power amplifier 60 then receives directly the electrical output from photocell unit 48 while the power amplifier 61 receives the electrical output from photocell unit 56 as modified by circuit 63, and the power amplifier 62 receives the electrical output from photocell unit 51 as modified by circuits 65 and 64. The amplifiers 60, 61 and 62 are preferably of the adjustable type so that the output voltage may be made any desired function of the input voltage. The power amplifiers 60, 61 and 62 are connected by lines 72, 73 and 74 with the recording heads or guns of the reproducing unit now to be described. The output voltages from the three-color channels control the reproducing unit, therefore, through these three-wire connections.

With each photocell scanner 41, 41′ there is associated a recorder head or gun. These are denoted at 75 and 75′, respectively. Since the two recorder heads or guns 75 and 75′ are identical in construction, only one need be described in detail. Corresponding parts of the other will be denoted by the same reference numerals but primed. The guns are adapted to apply the ink to the recording sheets on which the colored pictures are to be reproduced.

These sheets 83 and 83′ are secured to a roll or drum 76 which is adapted to be rotated and moved axially in time with the rotational and vertical movements of prism 25. The drum 76 is provided with trunnions 77 and 78 at opposite ends thereof. The trunnion 77 is journaled in a plain bearing in a pillow block 79 which may be secured to the supporting base 30. The trunnion 78 is threaded; and it threads into a nut (not shown) formed in a pillow block 80 which is also secured to base 30. Thus, as the drum 76 rotates it is also moved axially, thereby having a rotary and axial scanning movement relative to the guns 75 and 75′.

The drum 76 is adapted to be driven from gear box 28 in time with the rotation of the prism 25 through, for instance, a flexible cable 82. This cable is connected to one end of trunnion 78. The rate of rotation of the drum depends upon the number of sides or faces of the prism 25; and the drum should make as many revolutions per revolution of the prism as the prism has faces. If the prism has 120 faces, for instance, then the drum should make 120 revolutions per revolution of the prism. In other words, the drum 76 should make one complete revolution for one line of scanning of the color film to be reproduced.

The gun 75 (Figs. 3, 4 and 5) is suitable for three-color recording. It comprises a metal housing 85 which is formed with three parallel horizontally elongated droplet chambers 86, 87 and 88. Mounted in each chamber is a charging unit 90. Each charging unit comprises a corona electrode 91 and a surrounding shell 92. Each shell 92 is made in two halves, the forward half 92′ being constructed of porous non-corroding metal, such as powdered chromium, and the rear half 92″ of non-porous metal. Each shell is formed with an integral tubular portion 93 which projects from one side thereof through an opening in the droplet chamber. The projecting tubular portion 93 of each shell is connected by a line 94 to a voltage supply of about 5,000 volts positive. It is supported in the related droplet chamber 86, 87 or 88 and insulated therefrom by an insulating collar 95. It is supported at its opposite side by an insulation tube 100 which is connected to a source of partial vacuum to draw off any ink that may accumulate in the forward porous section 92′ of the shell. Each shell 90 is open at its front end as indicated at 101.

Each corona electrode 91 is made of porous metal and is supported by an integral tubular portion 96 which is carried in an insulating sleeve 97 that is mounted in the bore of the tubular portion 93 of the shell 92. The tube 96 is connected to a source of high voltage of about 20,000 volts positive through a line 98 and a current stabilizing device 99. This device may be a simple resistor or a constant current pentode. Tube 96 is also connected to a source of partial vacuum to permit sucking away ink which in the course of usage may accumulate in the porous corona electrode.

The three droplet chambers 86, 87 and 88 are narrowed at their forward ends to provide exit throats 121, 122 and 123, respectively, which communicate with ducts 106, 107 and 108, respectively, that are formed in the nozzle part 105 of the gun.

The central duct 107 is bounded on its sides by porous ceramic blocks 110 and 111 and at top and bottom by porous ceramic blocks 112 and 113. The latter blocks are coated or inlaid with porous conductive coatings 114 and 115. Both of these coatings terminate at their forward ends, as clearly shown in Fig. 3, just short of the mouth of duct 107. Coating 114 terminates at its rear end just short, also, of the rear end of the duct. Coating 115, however, extends rearwardly to the end of the duct and makes contact at its rear end, as shown, with housing 75 which is grounded. The lead 73 (Fig. 6) from the green channel of the signal-generating and color-correcting unit 41 is connected with the coating 114.

The upper duct 106 is bounded at top and bottom, respectively, by a porous block 116 made of an electrical conducting material, such as porous metal or graphited ceramic, and the porous ceramic block 112, respectively. It is bounded at its sides by the porous ceramic blocks 110 and 111, respectively. The upper side of porous ceramic block 112 is coated or inlaid with a porous conductive coating 117. This extends for the greater portion of the length of the duct 106 but terminates at front and rear just short of the mouth and of the rear end of the duct, respectively. It is connected to the lead 74 from the blue channel of the unit 41.

The lower duct 108 is bounded at top and bottom, respectively, by the porous ceramic block 113 and a porous block 118, respectively, the latter block being made of an electrical conducting material such as porous metal or graphited ceramic. It is bounded at its sides by the porous ceramic blocks 110 and 111. The under side of porous ceramic block 113 is coated or inlaid with a porous conductive coating 119. This extends for the greater portion of the length of the duct 108 but terminates at front and rear, respectively, just short of the mouth and of the rear end of the duct, respectively. It is connected to the lead 72 from the red channel of unit 41.

Blocks 116 and 118 are supported between the side blocks 110 and 111 of the nozzle and are secured thereto.

Figure 4:
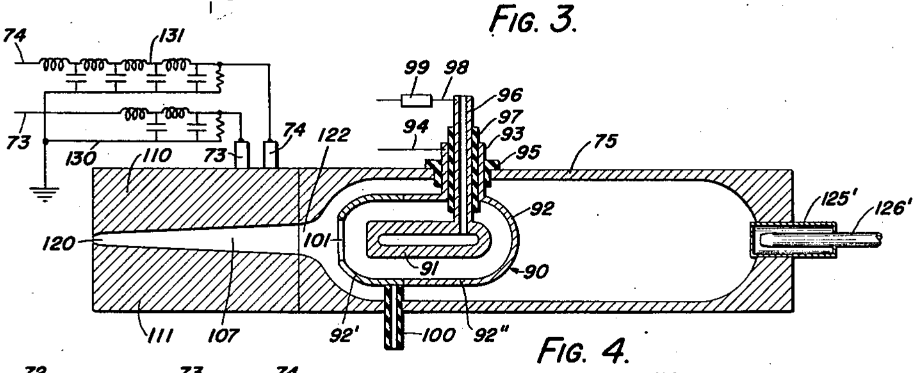
Fig. 4 is a horizontal sectional view taken centrally through the recording head or gun and showing diagrammatically the two delay circuits employed in conjunction with the head.
Figure 6:
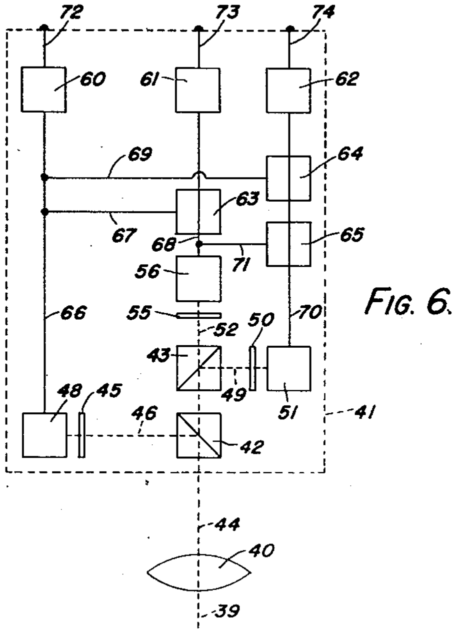
Fig. 6 is a diagrammatic view showing one form of color correcting circuit that may be employed in the signal-generating part of the apparatus.
Figure 5:
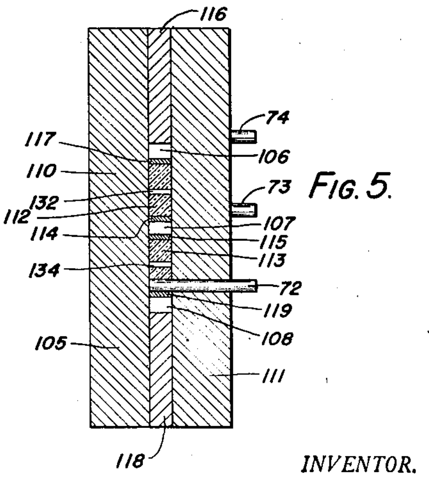
Fig. 5 is a vertical sectional view through the head or gun taken on the line 5—5 of Fig. 3.
Figure 7:
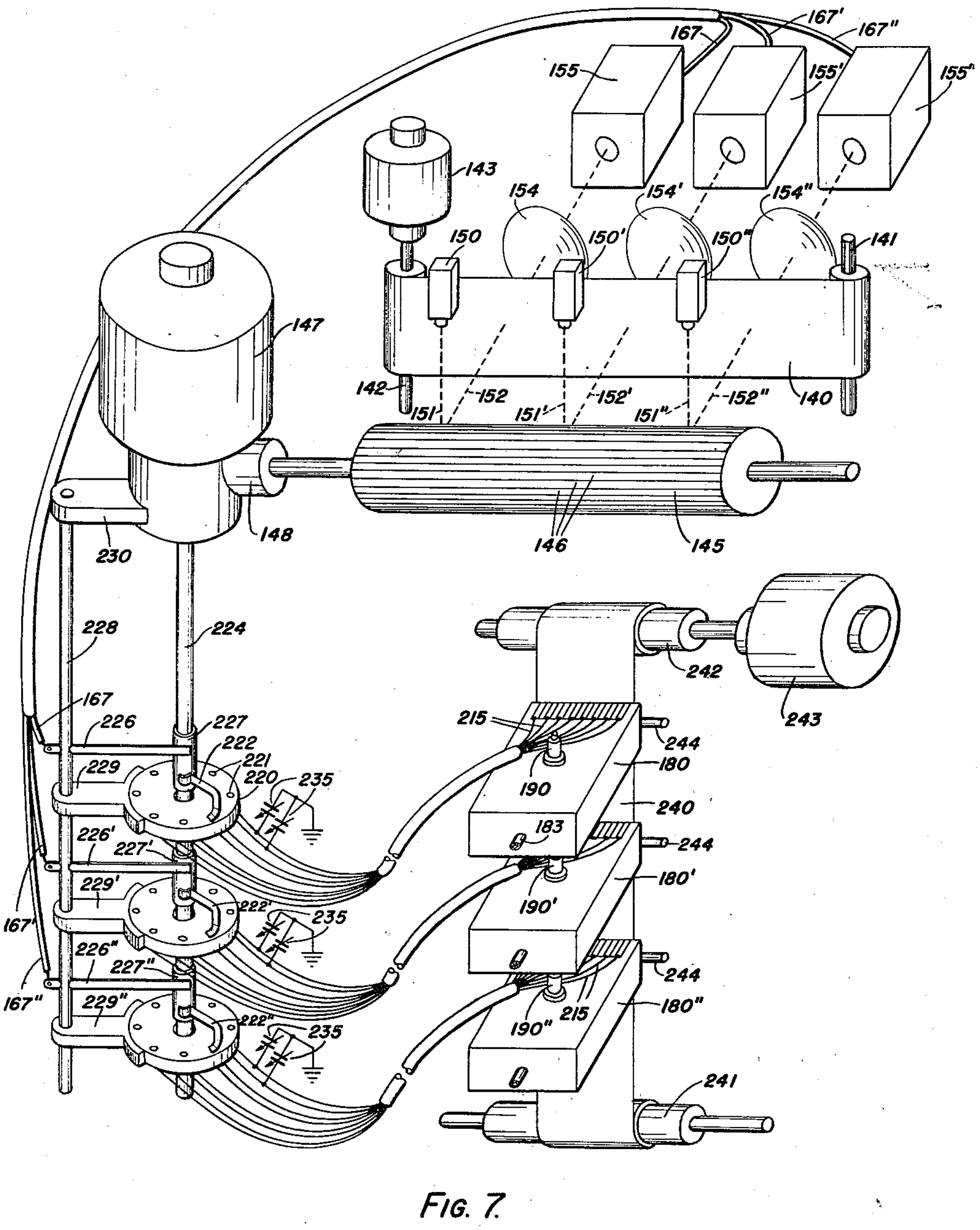
Fig. 7 is a more or less diagrammatic view of a modification of the invention.

Each of the three ducts 106, 107 and 108 is of uniform width from end to end in a vertical plane but the blocks 110 and 111 are so shaped that the sides of the ducts converge toward the mouths of the ducts in horizontal planes as shown in Fig. 4 particularly with reference to duct 107. The upper and lower ducts 106 and 108 converge from rear to front toward the central duct 107 as clearly shown in Fig. 3; and the three ducts discharge from the nozzle portion 105 of the recording head through a single orifice 120 which is of sufficient size to permit unhindered flow of the streams of ink particles against the recording sheet 83.

Atomizers 125, 125′ and 125″ are mounted at the rear ends of the droplet chambers 86, 87 and 88 to communicate therewith. These atomizers are identical in construction and may be of conventional structure. Similar parts of the atomizers are denoted by the same reference numerals but the parts of atomizer 125′ are primed and the parts of atomizer 125″ are seconded in order to distinguish the parts of different atomizers from one another. Atomizer 125 is connected through tube 126 to a source of compressed air and through tube 127 to an ink container 128 so that ink is drawn up by the jet of air from the container 128 and sprayed as a fine atomized mist into the droplet chamber 86. The other atomizers function in the same way with respect to their respective droplet chambers. The air pressure at the several atomizers is maintained as nearly constant as possible and may be in the neighborhood of ten pounds per square inch.

The process used in the present invention for producing colored reproductions is the well-known three-color subtractive reproduction process. As is customary in this case, the inks used should be complementary to red, green and blue, that is, minus red or cyan for the red channel, minus green or magenta for the green channel, and minus blue or yellow for the blue channel. Ink container 128, which corresponds to the blue channel, then, will contain yellow ink; ink container 128′, which corresponds to the green channel, will contain magenta ink; and ink container 128″, which corresponds to the red channel, will contain cyan colored ink.

In operation, the inks are sucked up from the several atomizers 125, 125′ and 125″ by the jets of air flowing through tubes 126, 126′ and 126″. The droplet chambers 86, 87 and 88 are, however, relatively large. Hence the atomized particles of ink in each chamber will lose most of their high blast momentum and flow slowly through the chamber as a fine suspension or mist. On the way to the throat of the chamber, the mist passes the opening 101 of the corona shell 92. Because of the high potential of the corona electrodes 91, a corona discharge occurs at tip 102 of each electrode. Positive ions originating in these corona discharges are repelled to shells 92. Some of these ions pass through the openings 101 in the shells to the narrow exit throats 121, 122 and 123 of the droplet chambers. In passing from the openings 101, the ion streams cross the mist streams in the several droplet chambers and charge the mist particles positively.

With the high potential of about 5,000 volts existing between each shell 92 and the related throat 121, 122 or 123, the charging of the ink particles will take place in a region of very high electric field intensity. This is quite desirable since the degree to which a particle can be charged is a function of the field strength in the region in which the charging takes place, and it is desirable to charge each particle to the maximum degree.

The velocities of flow of the streams containing the charged ink particles increase considerably in the narrower throats 121, 122 and 123.

After leaving the throats 121, 122 and 123 the streams enter the related precipitation ducts 106, 107 and 108. The housing 85 is kept at or near ground potential so that conductive coating 115 is also at or near ground potential. Blocks 116 and 118 are also kept at or near ground potential. The voltages on conductive coatings 117, 114 and 119, however, are determined by the leads 74, 73 and 72, respectively, that is by the transmitted signals from the blue, green and red channels, respectively, of the unit 41.

When the voltage on any of the leads 74, 73 or 72 is zero, the stream of ink droplets in the corresponding duct 106, 107 or 108 passes through the duct and out of orifice 120 with practically no loss of ink particles on the grounded wall 116, 115 or 118 of the duct. When the voltage is positive, however, on any one of the leads, some of the particles are precipitated on the corresponding grounded electrode 115, 116 or 118 as the case may be; and when the voltage is very positive, say 800 volts or more, all of the ink particles in the stream effected are precipitated from the duct.

As they leave the ducts 106, 107 and 108, then, the three streams of air contain varying concentrations of differently colored ink particles, the number of ink particles in any one stream depending on the number precipitated out of the stream, by the action of the positive electrodes 74, 73 and 72. These three streams pass through orifice 120 and impinge on record receiving sheet 83 wrapped around drum 76 producing colored marks on the sheet if there are ink particles in the stream. The intensity of these marks is determined by the concentration of particles in the stream. If all of the particles have been precipitated out of a stream, as will be the case when the signal on an electrode 74, 73 or 72 is at the maximum, then no mark will, of course, be produced on the sheet 83.

With the three-color subtractive reproduction process, if the original subject picture has only red color at the point of scanning, for instance, then the signal produced in line 72 will be of maximum intensity and all of the cyan ink particles will be precipitated out of the stream in duct 108. There will be no signal generated, however, in lines 73 and 74. Hence, the magenta and yellow ink particles in the streams passing through ducts 107 and 106 will not be deflected therefrom but will be all deposited on the sheet 83 at the point of recording. This will mean that at that point sheet 83 will be colored with magenta and yellow inks but will have no cyan ink thereon. The magenta is minus green. In other words it will filter out green. The yellow is minus blue; that is it will filter out blue. When light falls on sheet 83, then, at the described recording point, the observer will see no green color and no blue color because these colors are filtered out, but he will see red color because there is no cyan or minus red ink on the sheet at the recording point. For other colors or combinations of colors or variations in color, obviously the controlled signals will cause the cyan, magenta and yellow inks to make a record on sheet 83 which will correctly reproduce to the observer's eye the original subject matter picture.

It is desirable that ink gun 75 be carefully located with respect to drum 76 so that the converging stream of ink particles issuing from orifice 120 may be focused sharply on recording sheet 83 as a very tiny area.

Since the three ducts 106, 107 and 108, while leading to a single vent or orifice 120 do not deposit their ink particles simultaneously at the same point on the paper but at points slightly displaced vertically above one another, it is desirable that the signals received by the central or green duct 107 from line 73 be delayed with reference to the signals, which are received by the lower or red duct 108 from line 72, by a time interval equal to the time required for the recording sheet 83 to rotate from the lower to the central portion of the focal area produced by the three ink streams on sheet 83. Similarly, the signals received by the upper or blue duct 106 from line 74 should be delayed with reference to the signals, which are received by the lower or red duct 108 from line 72, by a time interval equal to the transit time of the recording sheet 83 from the lower to the upper portion of the focal area. This delay can readily be accomplished by standard delay circuits such as indicated at 130 and 131 (Fig. 4) which comprise inductances, condensers and resistors. More inductances and condensers than those shown may, of course, be used to obtain the proper delays. Delay circuit 130 is incorporated in lead 73 and delay circuit 131 is incorporated in lead 74.

The drum 76 is rotating and moving axially all the while under gun 75 in synchronism to the rotary and vertical movements of prism 25. The sheet 83 has, therefore, a scanning movement, relative to gun 75 which is synchronized to the scanning of the picture 20 which is to be reproduced. Hence, through the signals carried by lines 72, 73 and 74 and controlled by the scanning action and the red, green and blue channels of the signal generating mechanism, the colored picture 20 can be reproduced on sheet 83 in correct color. The color correction in the unit 41 insures correction for the deficiencies in color of the inks and assures a high quality color reproduction.

Since the color correction unit 41 can be adjusted to correct for the color deficiencies in the inks used in the gun and/or the dyes in the original if the original itself needs correction, a very high quality color reproduction can be made. It is also obvious that a reproduction, that is a negative of the original can readily be made by using inversion type amplifiers to amplify the scanning signals.

The linear speed of the flow of the atomized ink through the ducts 106, 107 and 108 and the distance between the grounded plates 116, 115 and 118, respectively, of those ducts and the plates 117, 114 and 119, to which the signals are supplied, determined in each case the minimum length of the duct since in each case at maximum signal the ink droplets must be exposed to the related plate 116, 115 or 118 for a sufficient length of time for all of the droplets to be completely precipitated. The supply of a current of high potential to the shells 92, however, causes electrical fields of high intensity to be formed between the shells and the grounded housing 75 across throats 121, 122 and 123. Hence, the charging of the ink-particles in the throats by ions, which are discharged from electrodes 91 through openings 101, takes place in fields of high intensity. Hence charges can be put on the ink particles which are of many times the charges which could be secured were there no electrical fields in the throats 121, 122 and 123. This high-charging of the particles speeds up the system, for the heavily charged ink particles precipitate more rapidly in ducts 106, 107 or 108 in response to the control signals, and these ducts can be shorter than would otherwise be required.

The ink, which is deposited on the conducting coatings 114 and 117 of porous block 112 or on the block itself, is drawn off through a duct 132 connected to a source of partial vacuum. The ink, which is deposited on the conductive coating 119 of porous block 113 or on the block itself, is drawn off through a duct 134 which is connected to a source of partial vacuum. The ink, which is deposited on the blocks 116 and 118, is drawn off through ducts 136 and 138, respectively, which are connected to a source of partial vacuum. The outsides of plates 116, 112, 113 and 118 should be painted to contain these partial vacuums. Ink accumulating in the droplet chambers 86, 87 and 88 returns through ducts 129, 129′ and 129″, respectively, into the containers 128, 128′ and 128″, respectively.

Figure 2:
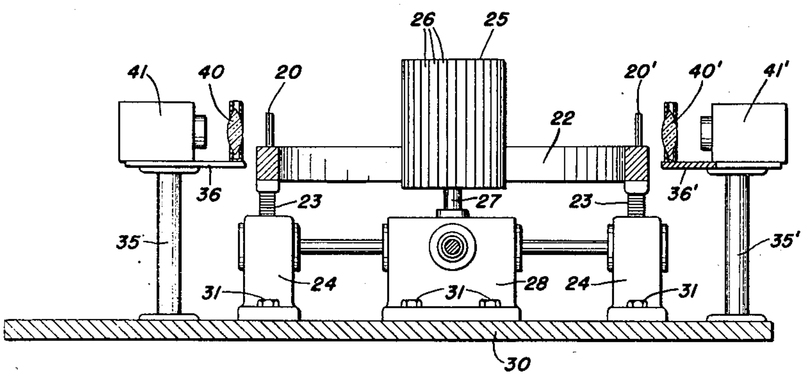
Fig. 2 is a vertical sectional view taken through the scanning part of this apparatus.
Figure 3:
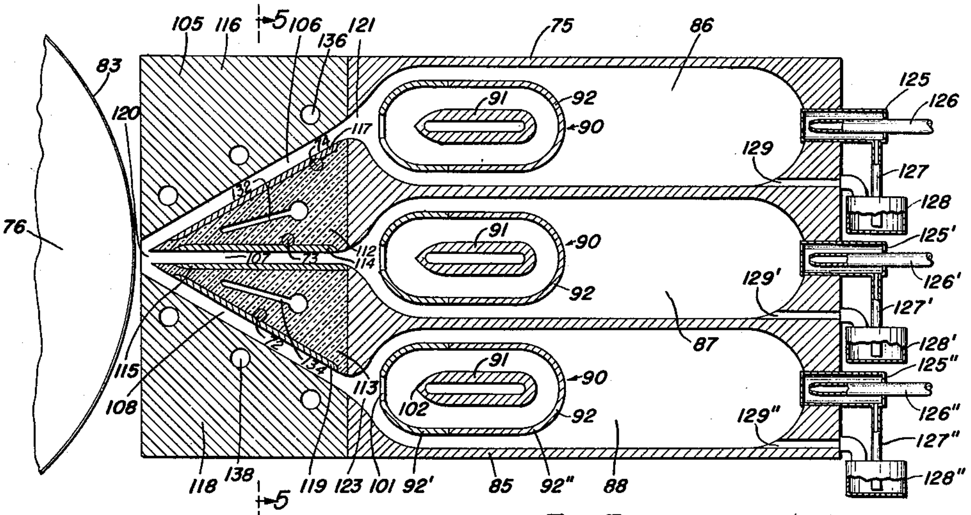
Fig. 3 is a vertical sectional view on an enlarged scale through one of the recording heads or guns of the apparatus and showing fragmentarily, also, the recording drum.

While only two transparencies are shown being reproduced in Figs. 1 and 2, this is only illustrative. It is obvious that additional transparencies can be reproduced simultaneously by placing additional pictures on and additional receiving and transmitting units around ring 22 and by employing additional recording heads or guns corelated to these units and providing additional sheets on drum 76 corelated to these additional guns. The method of this invention permits of making separate prints from different transparencies simultaneously as indicated at 83 and 83′ in Fig. 1 which shows about half of each print completed. It will be understood, also, that the invention is not limited to the production of transparencies but may be used for reproducing color films, etc. It is also obvious that the scanning apparatus can be adapted to scan opaque as well as transparent originals.

The invention may be employed, too, in the recording of coded electrical signals or other electrical intelligence. For instance, through operation of control mechanism, signals may be generated that will cause a gun to apply to a record card or film an ink of a particular color for a particular intelligence that is to be recorded. Moreover, the location and sizes of these colored markings may be varied on the record sheet to record different, desired data. In other words, my invention permits a record to be made in color which will serve the same or a similar purpose as present-day punch card records.

Figs. 7 to 11 inclusive illustrate a further modification of the invention. Here 140 denotes a color film of which prints are to be made. The film to be reproduced may be unwound from a drum or reel 141 and wound up on another drum or reel 142, the latter being driven by a motor 143. Again, the scanning mechanism and the signal generating mechanism may be of any suitable type, and that shown here is for the purpose of illustration only.

This scanning mechanism may comprise a rotary prism 145 which is adapted to be driven at a constant speed from a motor 147 through a suitable gear reduction housed in housing 148. The prism 145 has a plurality of uniformly ground reflecting faces 146. Associated with the prism are three light projectors 150, 150' and 150''. These may be identical and project very narrow pencils 151, 151' and 151'' of substantially white light onto the rotating mirror or prism 145. These beams of light are reflected by the prism in a scanning motion onto the moving transparent developed color film 140. The reflected beams 152, 152' and 152'' are preferably focused on the film in very tiny scanning spots.

The scanning pencils 152, 152' and 152'' of light, after passage through the film, pass through lenses 154, 154' and 154'', respectively, and are brought by the lenses to substantially stationary spots on the three photo-receptive units 155, 155' and 155'', respectively. These units may be constructed as shown diagrammatically in Fig. 11. The pencil 152 of light, after passing through lens 154, for example, strikes a beam splitter 156 which may consist simply of a half silvered mirror. Part 157 of the beam is transmitted through the beam splitter without deviation and the remainder 158 is reflected. The reflected portion 158 passes through a red filter 160 and falls on a photoelectric receptor and preamplifier unit or photocell 161. The transmitted portion passes through a green filter 162 and enters photoelectric receptor and preamplifier unit or photocell 163. The electrical output of this unit is made to modify by circuit 165 the output of unit 161 in a manner to produce the desired color correction in the red channel. This again is for the purpose of electrically correcting for the color-absorption characteristics of the dyes or pigments used according to known practice in the art. The electrical output from circuit 165, representing the corrected red color density of the film 140, is further amplified by power amplifier 166.

In similar manner, the pencil of light 152' after passing through lens 154' strikes a beam splitter 156' whence part of it is transmitted and part reflected. The reflected part passes through a green filter 170 and falls on a photo-electric receptor and preamplifier unit 161'. The transmitted portion passes through a red filter 172 and enters photoelectric receptor and preamplifier unit 163'. The electrical output of this unit is made to modify by circuit 165' the output of unit 161' in a manner to produce the desired color correction in the green channel. The electrical output from circuit 165', representing the corrected green color density of film 140, is further amplified by power amplifier 166'.

Likewise, the pencil of light 152'' after passing through the lens 154'' strikes a beam splitter 156'' and part of it is transmitted through the beam splitter while part of it is reflected. The reflected part 158'' passes through a blue filter 175 and falls on a photoelectric receptor and preamplifier unit 161''. The transmitted portion 157'' passes through a yellow filter 176 and enters photoelectric receptor and preamplifier unit 163''. The electrical output of this unit is made to modify the output of unit 161'' by circuit 165'' in a manner to produce the desired color correction in the blue channel. The resulting electrical output, representing the corrected blue color density of film 140, is further amplified by power amplifier 161'' and transmitted to the reproducing head by a line 167''.

Figure 8:
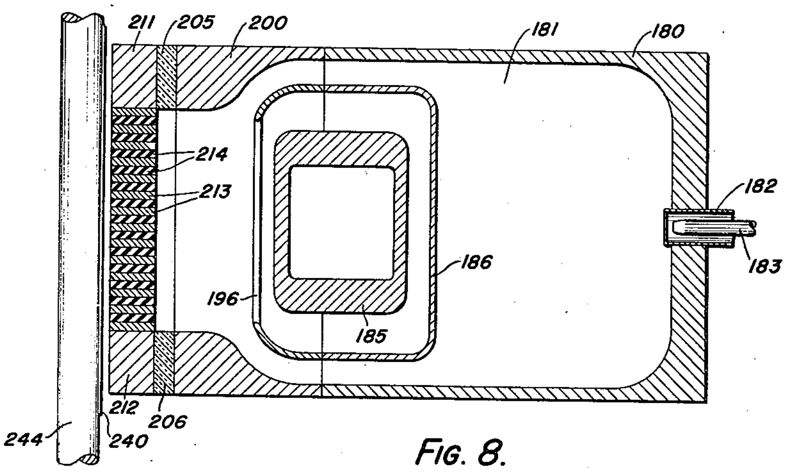
Fig. 8 is a horizontal sectional view through one of the recording heads or guns of this modified form of apparatus, and showing also the paper or film on which the picture is being reproduced.
Figure 9:
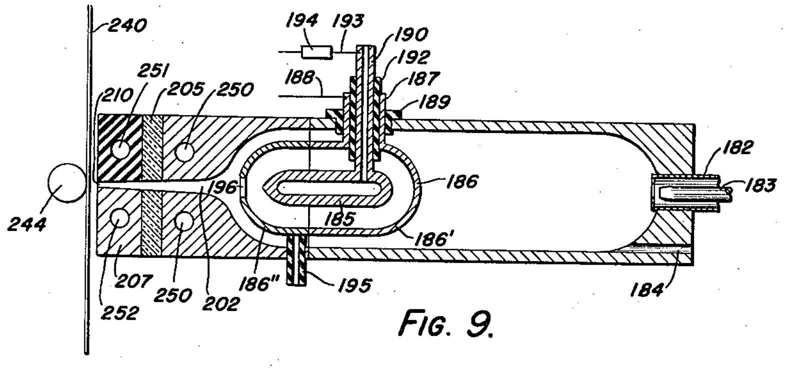
Fig. 9 is a vertical sectional view through this recording head taken at right angles to the view of Fig. 8 and centrally thereof from front to rear.
Figures 10, 11:
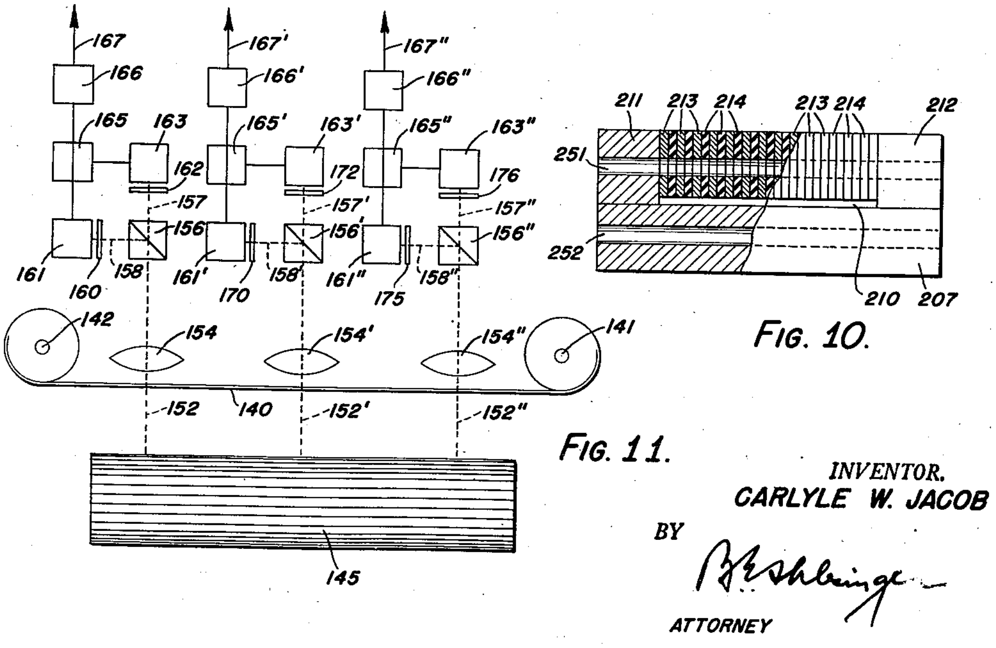
Fig. 10 is a part front elevation, part transverse sectional view of this recording head or gun.
Fig. 11 is a diagrammatic view showing details of the scanning and signal-generating parts of the apparatus of Fig. 7.

In this modification of the invention, there is a reproducer head or gun employed for each signal transmitting line 167, 167' and 167''. These guns are denoted at 180, 180' and 180'' in Fig. 7. They are identical and one only need, therefore, be described in detail. Their structure is shown in Figs. 8 to 10 inclusive.

Each gun comprises a housing 180 which is hollowed out to form a droplet chamber 181 to one end of which is connected an atomizer 182 whose nozzle is shown at 183. Mounted in each chamber is a corona electrode 185. This is surrounded by a shell 186 which is made in two halves 186' and 186''. The forward half 186'' of the shell is made of porous metal. The rear half 186' is made of non-porous metal. Both the corona electrode and shell may be constructed and mounted similarly to the corona electrodes and shells of the embodiment described with reference to Figs. 1 to 6 inclusive. The shell has a tubular portion 187 integral with it which projects through an opening in the top of the droplet chamber 181 and is supported in that opening by an insulating ring 189. The electrode is formed with a tubular projecting portion 190, which is supported in the tubular portion 187 of the shell and insulated therefrom by an insulating tube 192. A line 188 is connected to the shell to supply a voltage of about 5,000 volts positive. A line 193 connects the electrode tube 190 with a source of high voltage of about 20,000 volts positive; and a current stabilizing device 194 is preferably incorporated in this line. An insulating tube 195 supports the shell 186 at its lower end from the droplet chamber. The tubes 190 and 195 may be connected to sources of partial vacuum to draw off any ink deposited on the shell or electrode.

The shell 186 has an opening 196 at its front end, which is relatively wide horizontally but relatively narrow vertically. The corona discharge at the top of the electrode 185 is adapted to pass through this opening to ionize the ink particles in the atomized mist passing the opening.

The nozzle portion 200 of the gun is made of a porous metal block 200 which is shaped to provide a sharply narrowing throat 202. Secured to the front face of this block at opposite sides of the throat are two porous ceramic blocks 205 and 206 which form extended boundaries for the throat. Secured to the lower halves of the forward faces of the blocks 205 and 206 is a porous metal block 207 whose upper edge forms the lower boundary of the mouth or orifice 210 of the gun. Secured against the upper front faces of the blocks 205 and 206 adjacent the sides thereof are two blocks 211 and 212. Between blocks 211 and 212 are secured in any suitable manner a plurality of alternating metal plates 213 and insulating sheets 214.

The plates 213 are adapted to be connected by leads 215 (Fig. 7) with the terminals 221 of a distributor 220. The rotary arm 222 of this distributor is secured to a copper sleeve 227 that is mounted on and insulated from the shaft 224. This shaft is adapted to be driven from motor 147 in time with the rotation of prism 145; and is so geared to prism 155 as to make one revolution per face of the prism, that is, in one revolution of a prism, the shaft 224 makes as many revolutions as the prism has faces. Hence, each revolution of arm 222, 222' or 222'' corresponds to one line of scanning of film 145.

The lines 167, 167' and 167'' from units 155, 155' and 155'', respectively, are connected to brushes 226, 226' and 226'', respectively, which contact sleeves 227, 227' and 227'', respectively. The signals received from the units 155, 155' and 155'' are transmitted, then, through the lines 167, 167' and 167'', the arms 226, 226' and 226'', the sleeves 227, 227' and 227'', the arms 222, 222' and 222'', and the lines 215 to the plates 213 of guns 180, 180' and 180''. As the prism 145 revolves, then, the arms 222, 222' and 222'' revolve in timed relation therewith making contacts successively at different terminals 221 of the distributor plates and transmitting the electrical signals generated at the units 155, 155' and 155'' through the successive leads 215 to the metal plates 213 of the several guns 180, 180' and 180''.

A relatively small condenser 235 is connected to each line 215. When the arm 222, 222' or 222'' contacts a point 221 on the associated distributor plate, the associated condenser 235 and the associated precipitating plate 213 are charged to a voltage corresponding to the signal received at that instant. The condenser holds this voltage until the arm 222, 222' or 222'' again makes contact with this point, at which time a new signal voltage is applied. Only two condensers 235 are shown connected to each series of lines 215, but it will be understood that there is a condenser connected to each such line. The other condensers have been omitted for the sake of clearness in illustration.

The arms 226, 226' and 226'' are carried in a rod 228 which is supported from the housing 148 by a bracket 230. This rod also carries the arms 229, 229' and 229'' to which the commutator plates 220 may be secured in any suitable manner.

The recording paper or sheet 240 to be processed is wound off a reel 241 onto a reel 242 by operation of motor 243 to which the latter reel is connected. The sheet may be supported by guide rollers 244 at different points along its length so as to be held taut as it passes the guns.

In operation, the cyan, magenta, and yellow inks are sprayed by the atomizers into the chambers 181 of guns 180, 180' and 180'', respectively, in the form of fine mist. As the stream of mist in each chamber passes the opening 196 in the shell 186, the ink particles are exposed to the positive ion current from the corona electrode 185 and the ink droplets of mist will be charged positively. The plate 207 is kept at or near ground potential. The precipitating plates 213 of the guns 180, 180' and 180'' on the other hand have applied to them the signal voltages received from the units 155, 155' and 155'', respectively, and resulting from the scanning of film 140. When the signal voltage is zero on any of the plates 213 of any one of the guns, the ink droplets directly beneath that plate in the passageway 202 of that gun will all pass through the passageway in substantially full strength and accordingly will strike sheet 240 to produce a mark thereon of maximum intensity, the color of that mark depending upon from which gun the stream of particles issue. If, on the other hand, any of the plates 213 receives a positive signal voltage, ink particles directly beneath that plate will be precipitated from the stream of mist passing through duct 202. The percentage of particles deflected from the stream onto the associated plate 207 is determined by the signal strength or voltage; the greater the signal voltage on a plate, the greater the number of particles precipitated beneath that plate. When the signal is at a maximum, all the particles beneath the plate are precipiated; and consequently, no particles will reach the recording sheet, and no mark will be produced on the sheet at the area in front of that part of the orifice 210 which is beneath that plate.

The motor 243 for driving the recording sheet 240 is a synchronous type motor and is synchronized to motor 143 which drives original subject-matter film 140. The speeds of the two motors should be such that the transit time of subject matter film 140 from scanning beam 152'' to scanning beam 152' and to scanning beam 152 should equal the transit time of the recording sheet 240 from orifice 210'' of gun 180'' to orifice 210' of gun 180' and to orifice 210 of gun 180. Hence, the different colors of the picture of film 140 will be reproduced on sheet 240 by the several guns 180, 180' and 180'' to form a finished color picture.

As is apparent, the gun 180 is controlled by signals generated in the red channel, the gun 180' by signals generated in the green channel and the gun 180'' by signals generated in the blue channel. A picture is not completed, then, until it has passed all three guns.

This modification of the invention is not confined to reproduction of long rolls of film, since individual transparencies, or other original pictures may be mounted upon a belt carrier being unwound from reel 141 and wound upon reel 142. The apparatus of Fig. 7 can be used, moreover, as a printing press to reproduce thousands of copies of a single original. For this purpose, the original may be moved as though it were an endless belt passing continuously by the scanning beams, or a number of copies of the original may be obtained on a reel of film, or may be mounted upon a belt carrier and the film or carrier may be driven in endless belt fashion past the scanning beams so that the copies of the original will be scanned over and over again successively.

Ink particles deposited on the plates 200 of the guns are drawn off through ducts 250 (Fig. 9) which are connected to a partial vacuum. Ink particles deposited on the plates 211, 212, and 213 are drawn off through ducts 251 (Figs. 9 and 10), which are also connected to the partial vacuum. Ink particles deposited on the plates 207 are drawn off through ducts 252 also connected to the partial vacuum. The plates 200, 211, 212, 213, 207 are preferably painted on their outsides to contain this vacuum.

While the invention has been described in both of its embodiments in connection with actuation by signals that are electro-optically generated, it will be understood that the recording mechanism of the invention might also be actuated by signals generated in other ways, as for instance, by sound. It will be also understood that while the corona electrode and signal voltages have been described as positive, negative voltages might be used instead. It will further be understood that the voltages, which it has been suggested may be applied to the corona electrodes and their shells, are exemplary only, and that any suitable voltages may be employed for the purpose.

Furthermore, while the invention has been described in connection with three-color reproduction processes, it is applicable also, as will be obvious, to four-color and other color reproduction processes. Moreover, it will be understood that a plurality of color separation negatives can be individually scanned, and the intelligences in these negatives reproduced in a single positive reproduction having all the colors represented by these negatives.

In general it will be understood that while the invention has been described in connection with certain specific embodiments thereof and uses therefor, it is capable of further modification and use, and that this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. Apparatus for producing colored pictures comprising means for atomizing a plurality of differently colored inks to form separate streams of mist containing differently colored ink particles, means for electrically charging the particles in each stream, means for establishing electrical fields and for passing each stream through one of such fields, means for varying the intensity of each field to remove varying numbers of particles from each stream, and means for moving a record-receiving medium in scanning relation to the so-treated streams so that the particles remaining in the streams may be applied to said record-receiving medium.

2. Apparatus for reproducing colored pictures comprising means for scanning a subject picture and generating separate signals corresponding to different colors of the picture, means for atomizing a plurality of differently-colored inks to form separate streams of mist containing differently-colored ink particles, means for electrically charging the particles in each stream, a duct through which each stream is passed, said duct confining said stream, means for establishing an electrical field in each duct, means for varying the intensity of each field in accordance with one of said signals, and means for moving a record-receiving medium in scanning relation to the mouth of each duct so that the stream flowing therefrom may be applied to said record-receiving medium.

3. Apparatus for producing colored pictures comprising means for atomizing a plurality of differently colored inks to form separate streams of mist containing, respectively, differently-colored ink particles, an enlarged chamber through which each stream passes, means in each chamber for electrically charging the particles in the stream that passes therethrough, means for establishing electrical fields varying in intensity in accordance with received signals, means for passing each charged stream through one of said fields, and means for moving a record-receiving sheet in scanning relation to the several streams to apply the streams to the sheet.

4. Apparatus for reproducing colored pictures comprising means for atomizing a plurality of differently colored inks to form separate streams containing, respectively, differently colored ink particles, means for electrically charging the particles in each stream, means for establishing electrical fields varying in intensity in accordance with received signals, means for passing each of the charged streams through one of said fields, means for moving a record-receiving medium in scanning relation to said streams, and signal delay means for controlling the time of effectiveness of the signals upon the different fields to compensate for the time required for movement of the record-receiving medium between the different streams.

5. Apparatus for reproducing colored pictures comprising a plurality of separate chambers, means for supplying to each of said chambers a stream of gas having ink particles suspended therein, means in each of said chambers for electrically charging the ink particles in the related stream, and a duct leading from each chamber, each duct having opposing sides which are electrically conductive, and said ducts converging toward one another in the direction of discharge.

6. Apparatus for reproducing colored pictures comprising a plurality of separate chambers, means for supplying to each of said chambers a stream of gas having ink particles suspended therein, means in each of said chambers for electrically charging the ink particles in the related stream, a duct leading from each chamber, each duct having one bounding side that is porous and electrically conductive, and each duct having an opposite conductive boundary side that is connected to a source of electrical potential, and means for drawing off ink particles deposited on each duct.

7. Apparatus for reproducing colored pictures comprising three separate chambers, means for supplying to each of said chambers a stream of gas having ink particles suspended therein, means in each chamber for electrically charging the ink particles in the related stream, a pair of porous ceramic blocks secured to said housing, said blocks being separated to form a duct leading from one of said chambers, opposed sides of the blocks being provided with an electrically conductive material, the opposite sides of the two blocks being also provided with an electrically conductive material, and a pair of blocks made of electrically conductive material cooperating with the two last-named sides of the first-named blocks to form ducts leading, respectively, from the other two chambers of the housing.

8. Apparatus for reproducing colored pictures comprising three separate chambers, means for supplying to each of said chambers a stream of gas having ink particles suspended therein, means in each chamber for electrically charging the ink particles in the related stream, a pair of porous ceramic blocks secured to said housing, said blocks being separated to form a duct leading from one of said chambers, opposed sides of the blocks being coated with electrically conductive material, the opposite sides of the two blocks being also coated with electrically conductive material, and a pair of blocks made of electrically conductive material cooperating with the two last-named sides of the first-named blocks to form ducts leading, respectively, from the other two chambers of the housing, said two last-named blocks being so shaped that the three ducts converge into a common mouth, and means for drawing off ink particles deposited on the sides of the ducts.

9. In an electrical signal recorder, means for supplying a stream of gas having suspended therein marking particles, a corona discharge chamber having a corona electrode mounted therein for producing ions, a passageway through which said stream must pass, the walls of said passageway having two conducting surfaces therein which are insulated from one another, means for supplying different electrical potentials to these surfaces to produce a strong electrical field in said passageway, said corona chamber having an opening therein to permit flow of ions from said chamber into said passageway in the region of said electrical field to heavily charge the particles in said stream, means for selectively deflecting and removing the charged particles from said stream, and means for directing the so-treated stream at a recording medium, said medium being movable in scanning relation to said stream.

10. Apparatus for reproducing colored pictures comprising means for producing a plurality of separate streams of mist containing, respectively, differently-colored ink particles, means for electrically charging the particles in each stream, and ducts for passing the different streams through electrical fields, each of said ducts confining its stream, and means for varying the intensity of each field continuously in accordance with received signals whereby the number of ink particles passing through each duct may be varied, a record-receiving medium adapted to receive the ink particles which pass out of the mouths of the ducts, and means for effecting relative scanning movement between said medium and the said mouths.

11. Apparatus for reproducing colored pictures comprising means for producing a plurality of separate streams of gas containing, respectively, differently-colored ink particles, means for electrically charging the ink particles in each stream, means for electrically deflecting and removing from each of said streams varying quantities of particles in accordance with received signals generated by color-scanning of the picture which is to be reproduced, a record-receiving medium, and means for directing the remaining particles in the streams onto said medium while effecting relative scanning movement between the medium and the streams.

12. In an electrical signal recorder, means for supplying a stream of gas having suspended therein marking particles, means for providing a high potential electrical field through which said stream must pass, means for charging the particles in the stream as they pass through said field, and means for providing a second variable electrical field through which the stream of so-treated particles must pass to remove from said stream charged particles varying in number in accordance with the variation in said second electrical field.

13. In an electrical signal recorder, means for supplying a stream of gas having suspended therein marking particles, a corona discharge chamber having a corona electrode mounted therein for producing ions, a passageway through which said stream of gas must pass, said chamber lying at one side of said passageway, an electrically-conductive material at the other side of said passageway, means for supplying a voltage of high potential to one side of said passageway, means for causing said corona electrode to produce an electrical discharge, said corona chamber having an opening into said passageway to permit flow of ions from the electrode into the stream as it passes through the electrical field in said passageway to charge the particles in the stream, means for selectively deflecting and removing the charged particles from the stream in accordance with received signals, and means for moving a record-receiving medium past the so-treated stream.

14. In an electrical signal recorder, means for supplying separate streams of gas having suspended therein, respectively, differently-colored ink particles, means for providing high potential electrical fields through which said streams must pass, means for charging by ions the particles in each stream as they pass through said field, means for providing separate electrical fields through which the streams of charged particles must pass, and means for varying the intensity of each of the last-named fields in accordance with received signals generated by color-separation scanning for one color of an original colored subject-matter picture.

15. In an electrical signal recorder, means for supplying separate streams of gas having suspended therein, respectively, differently-colored ink particles, means for charging the particles in each stream, means for passing the streams of charged particles through separate electrical fields, the intensities of which vary in accordance with recorded signals, a record-receiving medium, and means for directing and focusing the several streams at a single area on the recording medium.

16. Apparatus for reproducing pictures which comprises a plurality of scanning means, a movable support for the pictures which are to be reproduced, means for moving said support past the scanning means so that they scan the pictures successively, a plurality of recording heads of equal number to the scanning means, each of said recording heads comprising means for atomizing a colored ink, means for charging the particles of the atomized ink, means for passing the charged particles through an electrical field, and means for varying the intensities of the electrical fields in the separate recording heads in accordance with recorded signals generated in different color channels by color-separation scanning by said scanning means, a record-supporting member, and means for moving the record-supporting member in scanning relation to the several recording heads successively, said last-named means being so timed to the means for moving said support that the time of transit from scanning means to scanning means is equal to the time of transit of the record-supporting member from recording head to recording head.

17. Apparatus for producing colored pictures comprising means for forming a plurality of streams of differently colored ink particles suspended in a gas, means for electrically charging the particles in each stream, and means for directing the charged particles at a record-receiving medium comprising a plurality of ducts, one for each stream, which converge toward their mouths, and means for applying different electrical potentials to opposite sides of each duct.

18. Apparatus for producing colored pictures comprising means for forming a plurality of streams of differently colored ink particles suspended in a gas, means for electrically charging the particles in each stream, and means for directing the ink particles at a record-receiving medium comprising a plurality of ducts, one for each stream, which converge into a single orifice, and means for applying different electrical potentials to opposite sides of each duct.

19. Apparatus for producing colored pictures comprising means for atomizing a plurality of differently colored inks to form separate streams containing, respectively, differently colored ink particles, means for electrically charging the particles in each stream, means for establishing electrical fields varying in intensity in accordance with received signals, means for passing the charged streams through said fields comprising a plurality of ducts, one for each stream, which converge toward their mouths, means for moving a record-receiving medium in scanning relation to the mouths of said ducts, and signal delay means for controlling the time of effectiveness of the signals upon the different fields to compensate for the time required for movement of the record-receiving medium past the mouths of the ducts.

20. Apparatus for producing colored pictures comprising means for scanning a subject colored picture including a single scanning beam, means for dividing the scanning beam into different spectral components corresponding, respectively, to separate basic colors of the picture, means for causing each spectral component to generate a signal, means for entraining particles of differently colored marking mediums in separate streams of gas, means for electrically charging the particles in each stream, means for passing each stream through an electrical field the intensity of which is controlled by one of said signals, means for directing said streams at a record-receiving medium, and means for moving said medium in a scanning movement relative to said streams in time to the scanning of the subject picture.

21. Apparatus for producing colored pictures comprising means for scanning a subject colored picture including a single scanning beam, means for dividing the scanning beam into different spectral components corresponding, respectively, to separate basic colors of the picture, means for causing each spectral component to generate a signal, means for forming a plurality of streams of particles of differently colored marking mediums suspended in gas, means for electrically charging the particles in each stream, means for passing each stream through an electrical field the intensity of which is controlled by one of said signals, means for directing the streams at a record-receiving medium, means for moving said medium in scanning movement relative to said streams in time with the scanning of the subject picture, and means for controlling the time of effectiveness of the separate signals to compensate for the time required for movement of the record-receiving medium between the different streams.

CARLYLE W. JACOB.

REFERENCES CITED

The following references are of record in the file of this patent:

UNITED STATES PATENTS

| Number | Name | Date |
|---|---|---|
| 1,709,926 | Weaver | Apr. 23, 1929 |
| 1,817,093 | Ranger | Aug. 4, 1931 |
| 1,941,001 | Hansell | Dec. 26, 1933 |
| 1,957,646 | Hinton | May 8, 1934 |
| 2,278,940 | Murphy | Apr. 7, 1942 |
| 2,413,706 | Gunderson | Jan. 7, 1947 |
| 2,415,051 | Thompson | Jan. 28, 1947 |
| 2,431,360 | Philpott | Nov. 25, 1947 |